United States Patent
Wendt et al.

(10) Patent No.: US 12,126,652 B2
(45) Date of Patent: Oct. 22, 2024

(54) SYSTEMS, METHODS, AND DEVICES FOR LOGGING ACTIVITY OF A SECURITY PLATFORM

(71) Applicant: PATHLOCK INC., Dallas, TX (US)

(72) Inventors: Greg Wendt, Dallas, TX (US); Chris Heller, Dallas, TX (US)

(73) Assignee: PATHLOCK INC., Dallas, TX (US)

( * ) Notice: Subject to any disclaimer, the term of this patent is extended or adjusted under 35 U.S.C. 154(b) by 0 days.

(21) Appl. No.: 16/719,795

(22) Filed: Dec. 18, 2019

(65) Prior Publication Data
US 2021/0194930 A1  Jun. 24, 2021

(51) Int. Cl.
*H04L 9/40* (2022.01)
*G06F 16/2455* (2019.01)
*H04L 41/0893* (2022.01)

(52) U.S. Cl.
CPC .......... *H04L 63/20* (2013.01); *G06F 16/2455* (2019.01); *H04L 41/0893* (2013.01); *H04L 63/102* (2013.01)

(58) Field of Classification Search
CPC ..... H04L 12/185; H04L 63/10; H04L 63/105; H04L 9/0637; H04L 63/061; H04L 63/1425; H04L 63/20; H04L 2463/102; H04L 41/0893; H04L 63/08; H04L 63/102; G06F 21/33; G06F 21/64; G06F 16/2455
See application file for complete search history.

(56) References Cited

U.S. PATENT DOCUMENTS 8,205,239 B1 * 6/2012 Satish ................... H04L 63/126
726/1
8,301,753 B1    10/2012 Melvin
9,003,509 B1 *  4/2015 Movshovitz ........ H04L 63/1408
726/13
9,460,169 B2   10/2016 Hinton et al.
2012/0179787 A1 *  7/2012 Walsh ................. H04L 63/0281
709/219

(Continued)

FOREIGN PATENT DOCUMENTS

WO    2021127232 A1    6/2021

OTHER PUBLICATIONS

International Application Serial No. PCT/US20/65690, Search Report and Written Opinion mailed Mar. 30, 2021, 10 pgs.

*Primary Examiner* — Hitesh Patel
(74) *Attorney, Agent, or Firm* — Morris, Manning & Martin, LLP; Anna Baker, Esq.

(57) ABSTRACT

Systems, methods, and devices log activity associated with security platforms implemented across web servers and application server. Systems include a first server including one or more processors configured to generate a plurality of log files based on requests received from a client device, where each log file is generated based, at least in part, on event information associated with a request and at least one of a plurality of custom parameters. Systems further include a second server comprising one or more processors configured to host an application accessed by the client device, where the first server is coupled between the client device and the second server and is configured to handle requests between the client device and the second server. Systems also include a database system configured to store application data associated with the application and the client device.

18 Claims, 7 Drawing Sheets

(56) References Cited

U.S. PATENT DOCUMENTS

| | | |
|---|---|---|
| 2013/0031613 A1 | 1/2013 | Shanabrook et al. |
| 2014/0089189 A1* | 3/2014 | Vasireddy .......... G06Q 20/4016 |
| | | 705/44 |
| 2014/0090085 A1* | 3/2014 | Mattsson ............ G06F 21/6218 |
| | | 726/28 |
| 2014/0207855 A1 | 7/2014 | Louie et al. |
| 2015/0128124 A1* | 5/2015 | Grey ...................... G06Q 10/06 |
| | | 717/171 |
| 2017/0075922 A1 | 3/2017 | Torman et al. |
| 2017/0171311 A1* | 6/2017 | Tennie .................... H04L 67/01 |
| 2018/0219890 A1* | 8/2018 | Rehak .................... H04L 63/14 |
| 2019/0147089 A1* | 5/2019 | Megahed ............ G06F 16/2477 |
| | | 707/718 |
| 2020/0213116 A1* | 7/2020 | Fattal ...................... H04L 63/20 |
| 2020/0304853 A1* | 9/2020 | Chen ....................... H04L 67/02 |

\* cited by examiner

SYSTEMS, METHODS, AND DEVICES FOR LOGGING ACTIVITY OF A SECURITY PLATFORM

TECHNICAL FIELD

This disclosure generally relates to security and authentication of application servers, and more specifically, to logging activity associated with such application servers.

BACKGROUND

Applications may be executed in an online and cloud-based environment in which application servers communicate with web servers and client devices to provide the client device with application services via a communications network. Providing access to application services in such a manner may be utilized in contexts such as enterprise applications and software as a service (SaaS) platforms. Such applications may have thousands of users, each of which issuing multiple requests and incurring multiple interactions with such application servers. Accordingly, a single application may service millions of requests and events associated with such users. Conventional techniques for implementing such applications remain limited because they are not able to effectively and efficiently observe and log such a vast number of requests and events in a manner that effectively and efficiently enables the prevention and reduction of the occurrence of security breaches.

DETAILED DESCRIPTION

Figure 1:
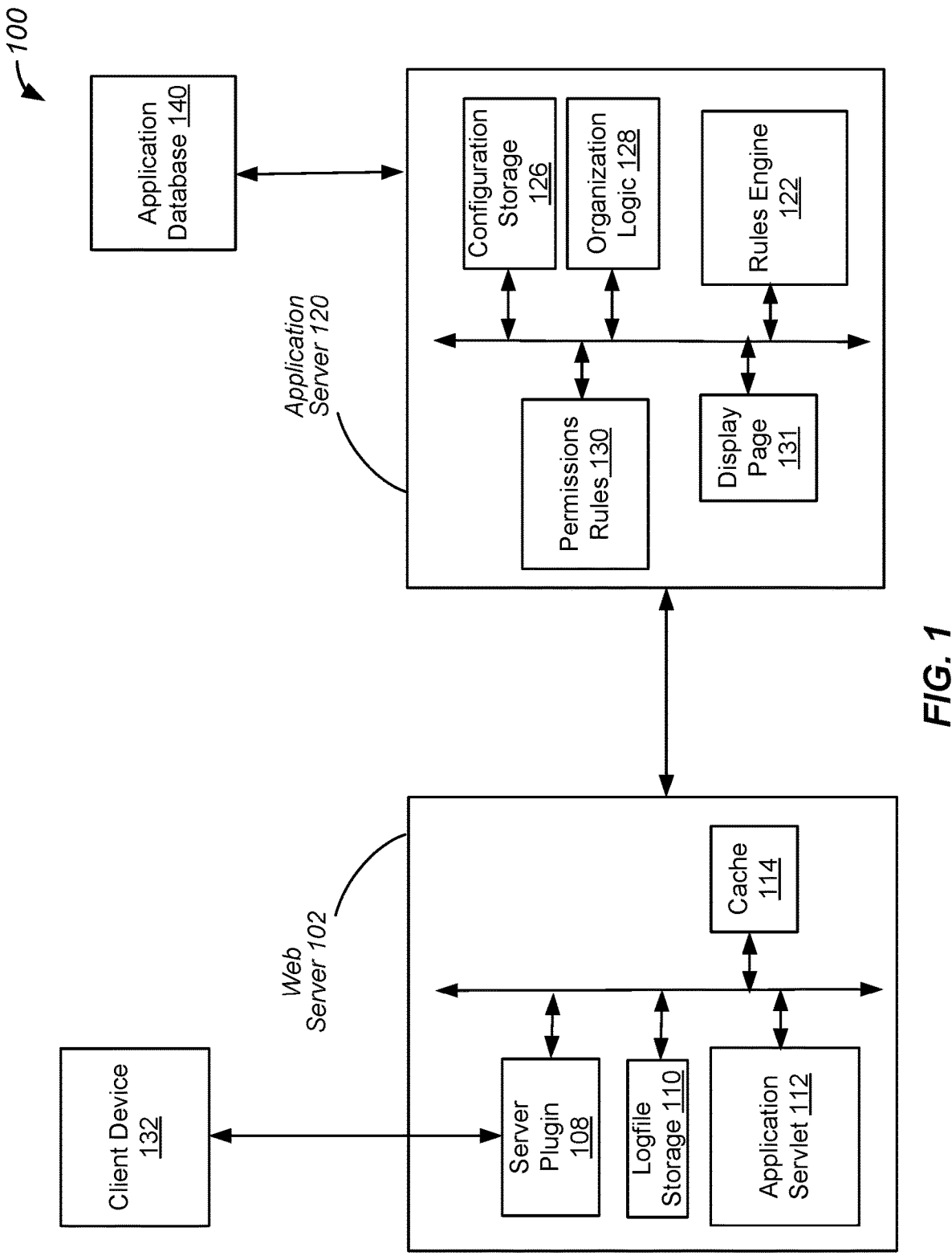
FIG. 1 illustrates an example of a system for implementing and logging activity of a security platform, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Traditional logging systems offer limited logging capabilities as they typically offer logging options related to broad swaths of activity, such as errors only, warnings only, and debug events, etc. However, such options produce large amounts of data that take significant amounts of time to sort through. Accordingly, if a particular event occurs, such as a security breach, and causes a disruption in the implementation of the application, identifying the event itself as well as the cause of the event requires a significant amount of time due to the large amount of data that must be analyzed, and the result of such an analysis is typically determined well after the event has already occurred.

Systems, methods, and devices are disclosed herein that provide a security platform that enables detailed custom logging of specific types of events as well as control of types of entities associated with such events. Also disclosed herein are improved techniques for identifying events, such as security threats and breaches, based on such logged information. More specifically, systems, methods, and devices disclosed herein provide detailed and customized logging of events based on underlying hardware/device information, as well as application specific contextual information. Custom queries may be generated to identify specific types of events, such as an illegal data access, and one or more operations, such as a security operation, may be implemented in response to identifying a specific type of event. As will be discussed in greater detail below, the generation of the logged information as well as the implementation of the queries may be configured based on hardware/device information as well as application specific contextual information, thus reducing the total amount of logged information analyzed, and providing an increased speed and accuracy of the query itself. In this way, the event may be identified quickly and in real-time, and security operations may be implemented with increased speed and efficiency, and in a manner capable of addressing the event in real-time.

As will also be discussed in greater detail below, systems, methods, and devices may be implemented in the context of enterprise applications in which the application is hosted and served to clients via various application servers and web servers which may be implemented in clustered and distributed environments. Such applications may be implemented for numerous clients in numerous different domains and geographical locations, as may be the case for a large organization or company. Furthermore, the application itself may have many different modules or components which may operate as discrete applications implemented in separate application domains. In one example, such an application may be PeopleSoft™, which may be served to client devices situated across the globe, as may be the case for a global organization or company. Such an application may have multiple different partitions or modules, such as one for each of human capital management, workforce management, workforce service delivery, and talent management. Each module may have sub-modules or sub-applications. For example, human capital management may include sub-applications for benefits, payroll, and pension administration.

Furthermore, users of the application that interact with the application via client devices may have one or more roles within the organization. For example, a user may have a role of one of "contractor", "intern", "director", or "executive". As will be discussed in greater detail below, each role may have an associated level of access granted to it. Accordingly, each role may have designated permissions that control access to the various modules and components of the application.

Further still, each user may have a user profile that is maintained by the application in a database system. The user profile may include information such as biographical data of the user, as well as a designated user identifier (UID). In some embodiments, designated device identifiers may also be included for client devices used by the user. Furthermore, in some embodiments, previous event data or historical data may also be stored for the user.

As will be discussed in greater detail below, systems, methods, and devices disclosed herein provide customized logging and improvements in querying of logged data in such distributed and largescale environments by improving the efficiency with which such logged information is generated and threats are identified, and also by increasing the accuracy with which such threats are identified. In this way, systems, methods, and devices disclosed herein provide the generation and querying of logged data that enables efficient and real-time threat assessment and implementation of security operations in such largescale environments.

FIG. 1 illustrates an example of a system for implementing and logging activity of a security platform, configured in accordance with some embodiments. As will be discussed in greater detail below, systems disclosed herein, such as system 100, may be configured to log various activity associated with client devices, web servers, application servers, as well as database systems that are implemented in a distributed environment, and in a manner that enables detailed logging of activity, as well as various control and/or security operations that may be implemented based on such activity. As will also be discussed in greater detail below, the log files may be generated based on an extensive access to activity underlying the system, and the generation of such log files may be customized to increase the efficiency with which such log files are generated and stored, as well as increase the efficiency with which such log files may be searched and analyzed.

In various embodiments, system 100 includes various client devices, such as client device 132, which may be client machines and client devices used to access other components of system 100 as well as services provided by such components. For example, client device 132 may be a computer or mobile device, such as a smartphone, that is used to execute a portion of a cloud-based or enterprise application, such as PeopleSoft®. Accordingly, client device 132 may be configured to execute a locally installed application that communicates with one or more other components of system 100. As shown in FIG. 1, system 100 may include multiple client devices. As described above, such client devices may number in the hundreds if not thousands, and may be implemented across numerous geographical regions and domains. Accordingly, client devices included in system 100 may be different types of devices, utilizing different operating systems, utilizing different languages, as well as different communications modalities.

System 100 further includes web server 102 which is configured to communicate with client devices, such as client device 132, and is also configured to handle requests received from client device 132. Accordingly, web server 102 may be configured to communicate with client device 132 via a first communications interface and a communications network, such as the internet, and may be further configured to receive requests from client device 132 and provide responses to client device 132. In various embodiments, web server 102 includes various components configured to provide services specific to a particular application, as well as generate log files associated with such an application and enable security features based on such log files. As will be discussed in greater detail below, log files may store logged events, and may be generated based, at least in part, on parameters identified by log tokens. As will also be discussed in greater detail below, log tokens may be customizable data structures that a user can configure to customize logging implemented in a system such as system 100.

Accordingly, web server 102 includes server plugin 108 which is configured to log activity and generate log files, as will be discussed in greater detail below with reference to FIGS. 2-6. As shown in FIG. 1, server plugin 108 may include a logging layer is implemented between the client devices, such as client device 132, and other components of web server 102 as well as downstream components, such as application server 120. Server plugin 108 is configured to handle communications between web server 102 and client device 132, and thus is able to track and log all activity between web server 102 and client device 132, as well as between application server 120 and client device 132. As will also be discussed in greater detail below, server plugin 108 is further configured to track and log activity between client device 132, and other components of system 100 as well. In this way, server plugin 108 has extensive access to interactions between client device 132 and other system components used to execute and run an application. Specifics of the requests and transactions associated with client device 132 as well as the generation and use of log files will be discussed in greater detail below with reference to FIGS. 3-5.

In various embodiments, server plugin 108 is configured to enable tracking and logging that is configured based, at least in part, on native properties of the application that is being hosted. Such application properties may be particular data fields on a screen or page presented to a user, a page or location within an application hierarchy, or any suitable part of an application architecture or structure. In this way, the native structure and configuration of the application hosted by application server 120, discussed in greater detail below, may be used to define parameters that are tracked, configure the generation of log files, and also configure the query of such log files and/or implementation of security operations based on such log files. As will be discussed in greater detail below, server plugin 108 is configured to enable tracking and logging that is specifically configured based on a combination of such application properties as well as hardware/client device properties.

In one example, server plugin 108 is configured to enable tracking and logging associated with particular data objects of an application that is supported by application server 120. More specifically, server plugin 108 may include a logging layer that is configured to enable the tracking and logging of particular data fields of the application, and interactions with such data fields. Accordingly, specific log files may be generated based on interactions with particular data fields, as well as additional parameters used to configure the generation of the log file, such as a user and role interacting with the data field as well as one or more other conditional parameters, such as whether or not a particular page or module was access prior to the interaction with the data field.

Furthermore, the logging of application data fields can be configured and implemented independently of how they may be represented in the encoding of the data fields that is native to the application may use. For example, custom identifiers may be generated to track and log particular data field interactions. In one example, an identifier named "Purchase Order ID" may be generated and used to log data field interactions. In this example, the native application might not have such an identifier, recognize such an identifier, or support such an identifier. Moreover, the context of an application implemented in a distributed manner that may have different client devices and display screens as well as different interactions/transactions in different industries and countries, different identifiers, such as "PO_HDR_SRCH_PO_ITEM_ID" and "PO_MASTER_PO_ITEM_ID" may be used in different parts of the application/system, and the application might not have a way to reconcile the different identifiers.

Accordingly, when an application is implemented in such a distributed environment, the different identifiers used to reference a particular data field may number into the tens or even hundreds. In this example, server plugin 108 is configured to support the representation of these different identifiers, which may be native or local identifiers, as a custom identifier "Purchase_Order_ID", and thus enable the logging and tracking of activity associated with that data field across the various different environments and locations in which the application is implemented. Such custom identifier designations may be stored in server plugin 108, or in log file storage 110. In some embodiments, the custom identifier designations may be stored as a data object that maps the custom identifiers to the local/native identifiers. In this way, server plugin 108 is configured to handle numerous different ways of referencing a data field or data object of a distributed application, and is configured to implement logging/security operations across such a heterogenous environment. As will be discussed in greater detail below, the custom identifiers may be generated by a customer or user, or by server plugin 108.

Furthermore, server plugin 108 is configured to enable tracking and logging of the contextual environment of the application. In this way, server plugin 108 is further configured to support logging of the application environment itself. As discussed above, logging systems may allow access to environmental data such as a host name of a server and possibly operating system environment variables. However, server plugin 108 is configured to incorporate application environment information as well. Such information may include which backend application server processes a request, and which application domain is being used, as many largely distributed customers may have several application domains on a single physical server. In this way, server plugin 108 is configured to combine the tracking and logging of underlying system environmental information with application environmental information to generate an enriched set of tracked and logged environmental information.

As discussed above, the determination of types of events and information to be logged may be determined by a customer or user. In various embodiments, the determination of types of events and information to be logged may also be implemented by server plugin 108. For example, server plugin 108 may be configured to implement one or more machine learning techniques to determine types of events and information that should be logged, as well as determine when one or more actions should be taken based on such logged activity. Accordingly, server plugin 108 may be configured to identify types of log files that should be generated based on one or more environmental parameters, such as a type of application being implemented, types of users of the application, as well as a type of security concern that is to be prevented.

Moreover, server plugin 108 may be further configured to identify one or more actions to be taken based on the logged activity. For example, specific patterns of logged activity may be identified, such as an unusual number of access requests from a particular type of user to a particular type of data resource not typically associated with that type of user. In response to identifying the pattern of logged activity, server plugin 108 may determine that a particular action should be taken, such as the generation of a security notification or revocation of the user's access.

In various embodiments, training data may be utilized to train server 108 to implement the determinations described above. In various embodiments, such training data may be obtained from a test system in which system parameters and operations are simulated under normal conditions as well as conditions in which one or more security-related events is occurring, such as a brute force attack or other unauthorized access. In various embodiments, the training data may be specific to the application environment, and thus may be configured to model expected behavior of users of the application as well as abnormal behavior, as may be defined by the security-related events described above which may be defined by a user or system administrator.

Web server 102 also includes log file storage 110 which is a storage location used to store the log files generated by server plugin 108. Accordingly, log file storage 110 may be a local storage device that stores such log files in a particular manner, such as indexing logged events based on client device ID, user ID, and/or application ID.

Web server 102 further includes cache 114 which may be used to cache various configuration data about the application. Accordingly, particular configuration data may be stored in cache 114 so that it is quickly accessible to components of web server 102 as well as client device 132. In various embodiments, web server 102 also includes application servlet 112 which is configured to handle network requests for a particular application. For example, application servlet 112 may be configured to handle HTTP requests associated with the application.

System 100 also includes application server 120 which is configured to provide various services associated with the application. For example, application server 120 is configured to host components of an application, and create a server environment configured for the application. Accordingly, application server 120 is configured to run various components of an application utilized by client device 132 where such an application is a cloud-based application, an enterprise application, or provided as software as a service (SaS).

Application server 120 includes permissions rules engine 130 which is configured to manage and define permissions associated with the application. Accordingly, permissions rules engine 130 may be a processing device that is configured to store and maintain rules used to define classes of users, as well as permissions and access levels associated with such classes of users. Application server 120 also includes rules engine 122 which may be a processing device that is configured to store and maintain rules associated with the evaluation and storage of data. Accordingly, rules engine 122 is configured to store and maintain rules that underly the storage and retrieval of data from database 140 discussed in greater detail below.

Application server 120 further includes configuration storage 126 which is configured to store configuration data, such as that discussed above with reference to cache 114. Application server 120 also includes display page 131 which is configured to generate web pages for display on a device or machine, such as client device 132. Accordingly, such generation of display pages may be configured based on one or more aspects of client device 132, such as a resolution or size of a display of client device 132. Application server 120 additionally includes organization logic 128 includes rules that define data objects and process flows underlying the application. Accordingly, rules underlying the processes and workflows discussed in greater detail below may be stored in organization logic 128.

System 100 further includes application database 140 which may be a database system configured to store application data for the application. Accordingly, database 140 is communicatively coupled with application server 120, and is configured to store application data which may be user data, as well as various other configuration data. In various embodiments, database 140 may be a distributed file system, a clustered storage system, or any other suitable storage system. Moreover, database 140 may be a multitenant database system that supports multiple tenants of a particular application, or multiple applications.

While various embodiments of system 100 have been discussed above, it will be appreciated that various additional embodiments are contemplated herein. For example, system 100 may include multiple client devices, multiple web servers, multiple application servers, and multiple databases. Moreover, web server 102 may be configured to support multiple different applications, and may additional instances of application servlets. In this way, system 100 may support multiple enterprise applications, and tracked and logged information may be obtained from multiple enterprise applications.

Figure 2:
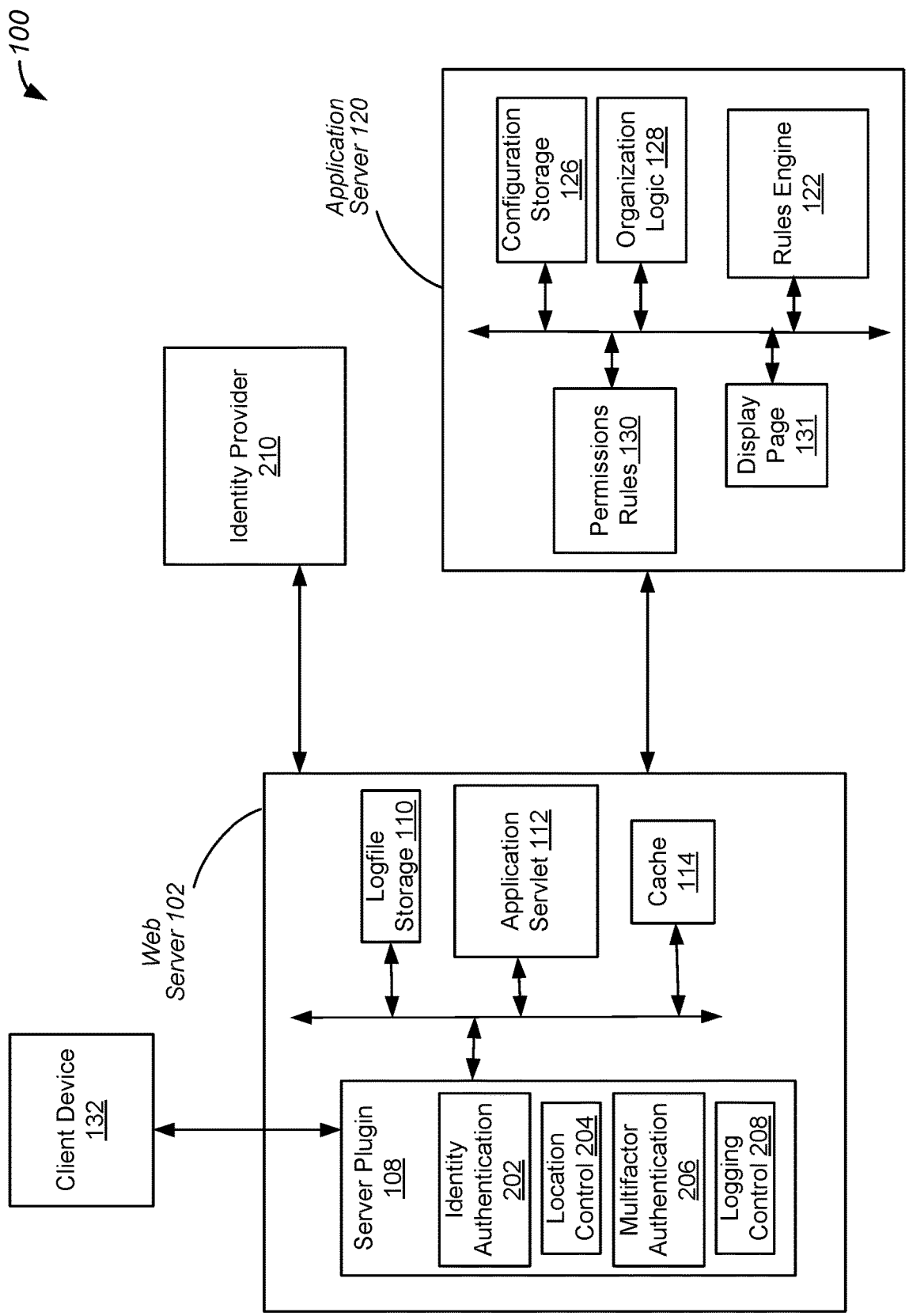
FIG. 2 illustrates another example of a system for implementing and logging activity of a security platform, configured in accordance with some embodiments.

FIG. 2 illustrates another example of a system for implementing and logging activity of a security platform, configured in accordance with some embodiments. As discussed above, systems disclosed herein may be used to generate log files based on interactions between client devices and various system components, such as web servers and application servers. FIG. 2 further illustrates how such systems are further configured to support user authentication, as well as logging of events associated with such user authentication.

Accordingly, system 200 includes client device 132. As discussed above, client device 132 may be a computer or mobile device, such as a smartphone, that is used to execute a portion of a cloud-based or enterprise application, and client device 132 may be configured to execute a locally installed application that communicates with one or more other components of system 200.

System 200 further includes web server 102, which as discussed above, is configured to communicate with client device 132, handle requests received from client device 132, and includes various components configured to provide services specific to a particular application, as well as generate log files associated with such an application and enable security features based on such log files. As previously discussed, web server 102 includes various components such as log file storage 110, application servlet 112, and cache 114.

As shown in FIG. 2, web server 102 further includes server plugin 108 which, as discussed above, is configured to handle communications between web server 102 and client device 132, is configured to track and log activity between web server 102 and client device 132, and generate log files based on such tracked activity. Accordingly, server plugin 108 as shown in FIG. 2 is configured to implement logging described above with reference to FIG. 1 with additional support for authentication processes discussed in greater detail below.

In various embodiments, server plugin 108 is further configured to include various components to facilitate the implementation of security and authentication processes, such as a single sign-on. In some embodiments, server plugin 108 includes identity authentication 202 which is configured to handle and implement identity authentication that may be configured and utilized by a third party identify provider. Examples of such third-party identity providers or standards may be SAML, ADFS, and the Shibboleth Consortium. Server plugin 108 further includes location control 204 which is configured to implement one or more location-based constraints within the authentication process. Server plugin 108 additionally includes multifactor authentication 206 which is configured to manage multifactor authentication, such as two-factor authentication, if enabled. Server plugin 108 also includes logging control 208 which is configured to track and log events involved in the authentication process, such as requests sent by client device 132, responses provided by identify provider 210, as well as actions taken by identity authentication 202, location control 204, and multifactor authentication 206.

In various embodiments, system 200 further includes application server 120 which, as discussed above, is configured to provide various services associated with the application, such as hosting components of an application, and create a server environment configured for the application. Moreover, application server 120 may include components such as permissions rules engine 130, display page 131, configuration storage 126, organization logic 128, and rules engine 122.

System 200 also includes identity provider 210 which may be a third party identify provider. Accordingly, identity provider 210 may be a standard or organization that is configured to generate and manage authenticated access to users across multiple platforms. As shown in FIG. 2, web server 102 is communicatively coupled to identity provider 210, and is configured to facilitate implementation of such user authentication via server plugin 108.

Figure 3:
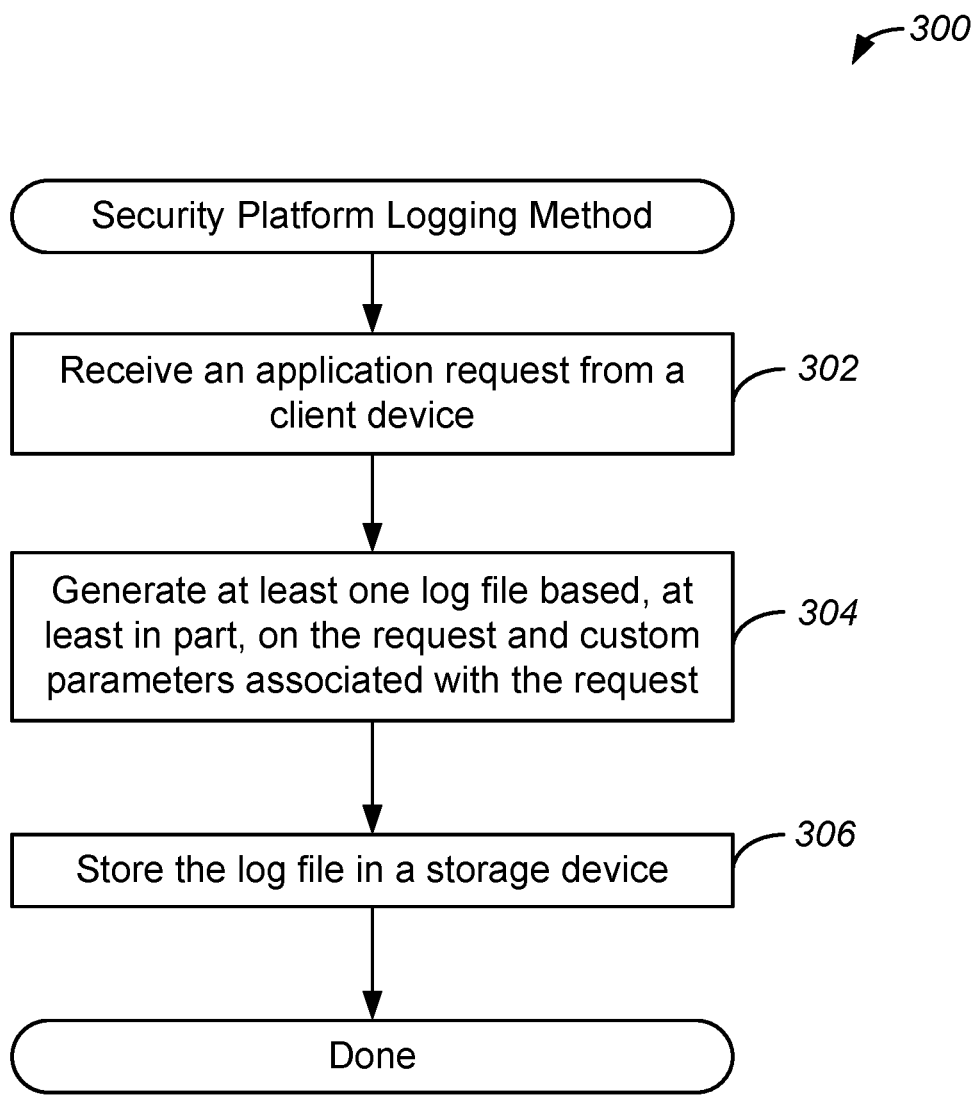
FIG. 3 illustrates an example of a flow chart of a method for implementing and logging activity of a security platform.

FIG. 3 illustrates an example of a flow chart of a method for implementing and logging activity of a security platform. As discussed above, interactions between client devices and components of an application, such as web servers and application servers, may be tracked and logged to generate log files. As will be discussed in greater detail below, the events tracked may provide an extensive and detailed view of client devices' usage of the application, and the customization of the log files as well as their generation and storage enables the efficient storage, retrieval, and usage of such log files.

Accordingly, method 300 may commence with operation 302 during which a request may be received from a client device. Accordingly, the client device may issue a request which is sent to a web server and handled by a server plugin. The request may be generated by a local application running on the client device, and may be a network request specific to a corresponding web-based application. As will be discussed in greater detail below with regards to FIG. 4 and FIG. 5, the request may be one of a number of different types of requests. For example, the request may be a login or sign-on request. In another example, the request may be a request for a file or record. In yet another example, the request may be a request for access to a particular domain of the application, or an interaction with or a modification a particular data field or combination of data fields. Accordingly, the request may be associated with sign-on or authentication operations, or may be associated with process operations of process and workflows of the application.

Method 300 may proceed to operation 304 during which a log file may be generated. Accordingly, a system component, such as the server plugin, may be configured to capture various data associated with the request, such as a user identifier, an application identifier, various information about the target of the request, time stamp information, latency and network information such as a time to serve, as well as various result information such as a failed login. In various embodiments, the log file may be generated based on one or more custom parameters which configure the data values captured and stored in the log file, as well as customize the storage of such logged data to facilitate custom searches which may be subsequently executed, as will be discussed in greater detail below.

Method 300 may proceed to operation 306 during which the log file may be stored in a storage device. Accordingly, once generated, the log file may be stored in a storage location, such as log file storage discussed above. Accordingly, once stored, the log file may be queried by other system components for the purposes of generating reports as well as implementing one or more authentication and or security operations, as will be discussed in greater detail below.

Figure 4:
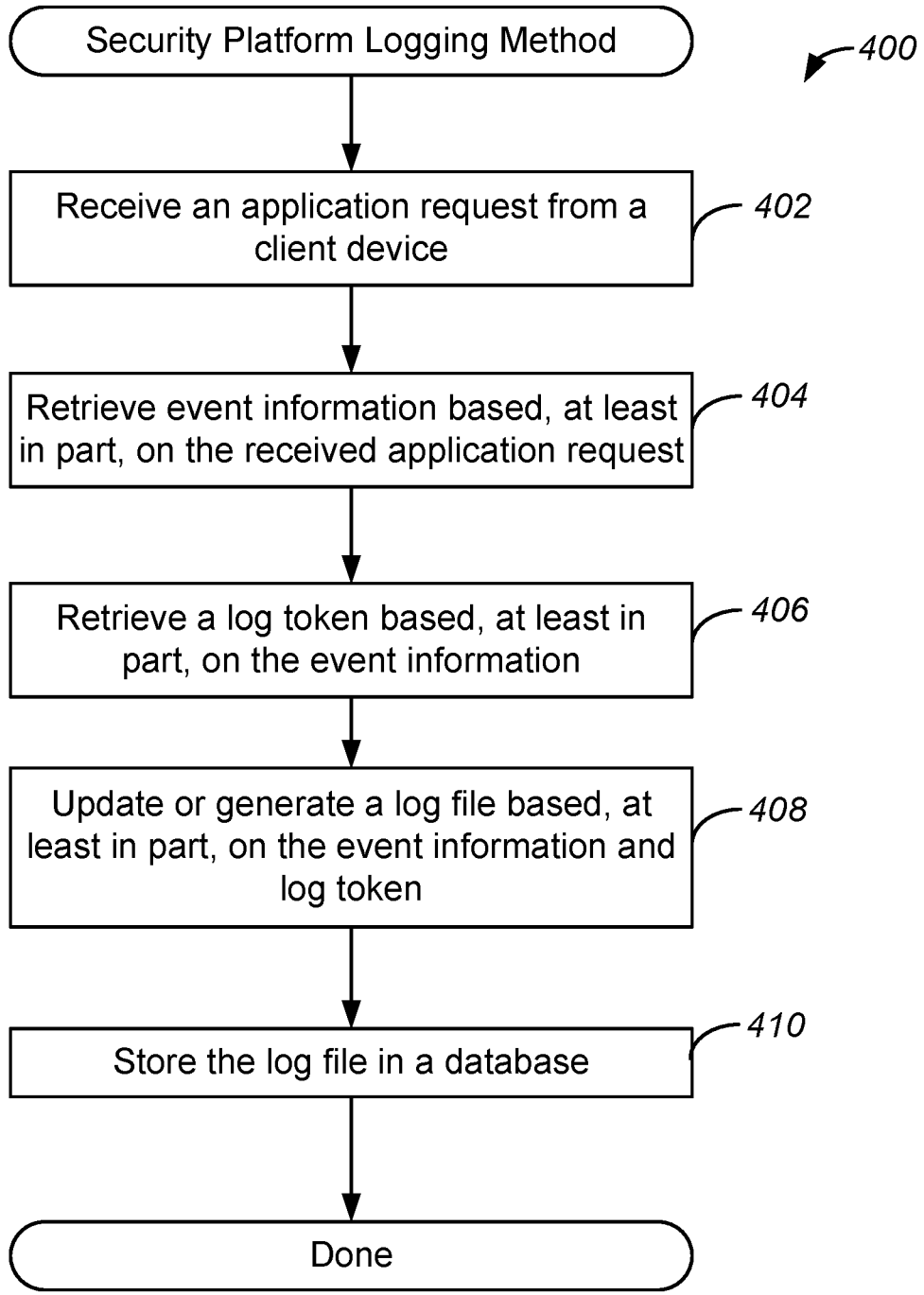
FIG. 4 illustrates another example of a flow chart of a method for implementing and logging activity of a security platform.

FIG. 4 illustrates another example of a flow chart of a method for implementing and logging activity of a security platform. As discussed above, interactions between client devices and components of an application, such as web servers and application servers, may be tracked and logged to generate log files. As will be discussed in greater detail below, log files may be generated in a customized manner which reduce an amount of space required to store such log files, and also enables custom searches of such log files to be implemented. As will also be discussed in greater detail below, the generation and storage of such log files is configured to enable such custom searches to be executed and results to be returned quickly and with increased efficiency.

Accordingly, method 400 may commence with operation 402 during which a request may be received. As discussed above, a request may be received from a client device, the client device may issue such a request to a web server, and the request may be handled by a server plugin. As also discussed above, the request may be one of a number of different types of requests, such as a login or sign-on request, a request for a file or record, or a request for access to a particular domain of the application.

Accordingly, the request may be an event which may be a user generated event or a system event, and such an event may include one or more actions in a context of an application environment. As discussed above, a system component, such as a server plugin, may be implemented in the context of an application environment, and may be integrated with a web server and application server underlying the application. Accordingly, the server plugin may be provided with extensive access to the application's components and operations. Because the server plugin may be authenticated and implemented within an application environment as a trusted plugin, the server plugin may have extensive visibility of the application environment and events occurring within the application environment. In some embodiments, during operation 402, an event may be monitored instead of a request being received. For example, an account access request may be monitored, or a request between modules or domains of the application may be monitored and identified. In this way, the request received may be an event that is monitored.

Method 400 may proceed to operation 404 during which event information may be retrieved. In various embodiments, the event information may include metadata and identifiers such as a user identifier, an application identifier, browser identifier, various information about the target of the request, time stamp information, latency and network information such as a time to serve, as well as various result information such as a failed login. Accordingly, the server plugin may retrieve such information from the request itself, or from other components of the system that may be associated with the request, such as an application server, or an identity provider. Moreover, the event information may also include hardware identifiers and characteristics identifying features of underlying hardware, such as storage capacity, operating system, and hardware component type. In various embodiments, the information that is retrieved is customizable and may be defined, at least in part, by a user. In this way, the server plugin may query and retrieve event information in response receiving the request, and the server plugin may determine which event information to retrieve based one or more designated parameters which will be discussed in greater detail below.

Method 400 may proceed to operation 406 during which a log token may be retrieved based on the event information. In various embodiments, a log token is a data structure that may point to a data record used to customize the generation of a log file based on a logged event, such as the receiving and/or handling of a request. The data structures may include log file parameters that are modifiable and configurable by a user and/or administrator to selectively store some information, while discarding or ignoring other information. As will be discussed in greater detail below with reference to FIG. 6, the information stored may be configured and selected to facilitate increases in speed of subsequent queries executed on the log file. For example, log file parameters may be configured such that a log file has a designated structure and includes designated data fields at designated locations. The log file parameters may also specify particular types of event information to be stored, as well as specify a format in which they are stored, and may also define other custom fields which may be modified by a user. The subsequently executed queries may be able to query this data with increased speed and efficiency due to the reduced amount of data stored and scanned, as well as the specific arrangement of the queried data into a designated and homogenized format. Accordingly, the parameters may be defined by a user, and they may be represented by a log token.

In various embodiments, the log files are configured to be generated responsive to one or more conditional parameters that may be determined based, at least in part, on a rules engine. Accordingly, such conditional parameters may be application specific and relate to a specific context within the application workflow. Thus, such conditional parameters may identify a combination of a user role/access level, a type of event such as a data storage location access request, a data type such as a national ID or a bank account number, as well as a series of operations or requests that may have been implemented before the event associated with the log file, such as the navigation of multiple menus or one or more login events. In this way, the conditional parameters used to trigger the generation of a log file provide application specific context regarding the logged event itself. In various embodiments, there may be numerous different types of log files that may be configured for different types of requests and different types of events. Accordingly, the server plugin may generate a particular log file based on an identified type of request that has been received, as well as the various other parameters discussed above, such as the conditional parameters.

In one example, an organization may want detailed logs of all activity related to failed logins. In this example, an application specific event, such as a failed login, may be identified. If applicable, a custom identifier may be generated for that event. Accordingly, any time a login failure message is generated by the application and sent to a client device via an application server and web server, the event may be logged and identified by the custom identifier. In this way, any attempt to login that is not successful is logged in a separate authentication failure log, and is referenced by a specific identifier which may be a custom identifier. Furthermore, the generation of such log files may be further constrained by one or more user properties, such as a user's role and/or a user's geographical location. In this example, log files would be generated only for login failures by users having a particular user role in a particular geographical location.

In another example, an organization, such as a university, may want detailed logging of exactly what students that work part-time as interns in a particular department, such as a Human Resources department, are doing in the system. In this example, logging of this activity at this level of detail for the entire system might be cost-prohibitive and overly resource intensive. However, according to various embodiments, logging of this activity at this level may be implemented responsive to identifying the user's designation or role. More specifically, the detailed logging is implemented and "turned on" based on whether a user has a designation or role of "Student Intern". In this way, embodiments disclosed herein provide customization of the types of activity that are logged, and also provide customization of whether or not logging is enabled or disabled.

In yet another example, an organization, such as a company, may have received reports from end-users that occasionally a particular transaction in the system is displaying data incorrectly. In this example, the issue occurs infrequently and has not been able to be reproduced in a test system, but may be a security issue due to the incorrect data being shown. Accordingly, such application events may be sparse and difficult to reproduce and predict. In this example, the logging may be configured to log all activity associated with that transaction as a separate log file that can then be reviewed later to determine whether or not the problem has occurred, and what lead to it. In this way, a particular transaction type may be identified and logged system wide such that custom log files are generated specifically for the identified transaction type, and capture all trackable information associated with each transaction.

In various, such parameters may be determined based on an application environment, and may be configured based on a specific domain, module, sub-module, or role of a user. Accordingly, the parameters may be configured to create logging conditions customized based on the underlying structure of an application environment, and that specifically target a relatively narrow window of activity that occurs in a specific segment of an application environment. In some embodiments, the parameters may be determined by the server plugin based previous activity or activity in related application environments may be used to auto-populate sets of parameters used to generate log tokens and log files. In various embodiments, the conditions are generated based on one or more artificial intelligence or machine learning algorithms.

In various embodiments, the generation of log tokens may be implemented prior to one or more operations discussed above. For example, log tokens and their associated parameters may be defined and generated before operation 402 described above. Moreover, the retrieving of log tokens and updating/generating of log files, discussed below, may be part of a monitoring process in which a system component, such as a server plugin continually monitors system activity. Accordingly, the application request described above may be a system request or system event that occurs within the system and is monitored.

Method 400 may proceed to operation 408 during which a log file may be updated or generated based, at least in part, on the retrieved information and the log token. Accordingly, the event information may be filtered and sorted based on the parameters identified based on the log token, and the resulting information may be stored in a log file that has a format that is also specified by such parameters. In some embodiments, aspects or parameters of the retrieved information may be compared against the log token and the parameters specified by the log token to determine if the parameters match. In this way, it may be determined if a log file should be updated or generated. In various embodiments, a new log file may be generated to store the event information. In some embodiments, a previously existing log file may be updated such that it includes the most recent event information. Accordingly, different logged events may be stored in a log file based on the conditional parameters that were initially used to generate and define the log file. Accordingly, while FIG. 4 describes one event, multiple events may be stored in a single log file.

Method 400 may proceed to operation 410 during which the log file may be stored in a database. As similarly discussed above, once generated, the log file may be stored in a storage location, such as log file storage. Accordingly, once stored, the log file may be queried by other system components for the purposes of generating reports as well as implementing one or more authentication and/or security operations. As will be discussed in greater detail below, the security operations may be threat assessment and/or detection operations that may be implemented responsive to a user request, or responsive to detected system activity. As will also be discussed in greater detail below, the authentication and/or security operations may be identified and implemented based on criteria/patterns of activity that are tied to a combination of device/application information and identifiers. Moreover, if appropriate, the log file may be propagated to other storage locations as well, such as another database system or another web server.

Figure 5:
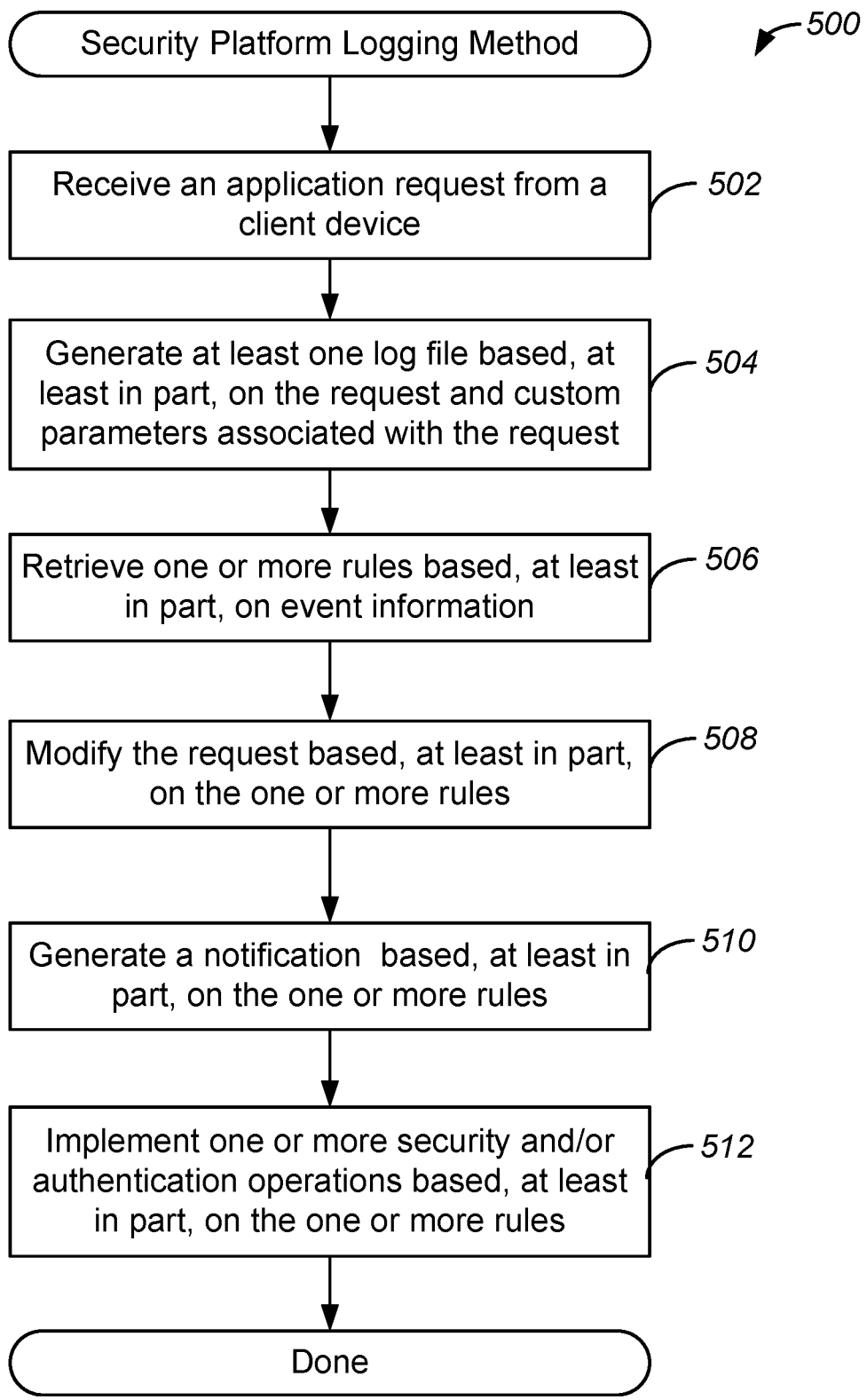
FIG. 5 illustrates yet another example of a flow chart of a method for implementing and logging activity of a security platform.

FIG. 5 illustrates yet another example of a flow chart of a method for implementing and logging activity of a security platform. As discussed above, interactions between client devices and components of an application, such as web servers and application servers, may be tracked and logged to generate log files. As will be discussed in greater detail below, log files may be generated in a customized manner which reduce an amount of space required to store such log files, and also enables custom searches of such log files to be implemented.

Accordingly, method 500 may commence with operation 502 during which a request may be received. As discussed above, a request may be received from a client device, the client device may issue such a request which to a web server, and the request may be handled by a server plugin. As also discussed above, the request may be one of a number of different types of requests, such as a login or sign-on request, a request for a file or record, or a request for access to a particular domain of the application.

Method 500 may proceed to operation 504 during which a log file is generated based, at least in part, on the received request. As discussed above, in response to receiving the request, event information as well as a log token may be retrieved. The event information may be filtered and sorted based on the parameters identified by the log token, and the resulting information may be stored in a log file that has a format that is also specified by such parameters.

Method 500 may proceed to operation 506 during which one or more rules may be retrieved. In various embodiments, the rules may be retrieved based, at least in part, on the event information that was received and retrieved at operations 502 and 504 respectively. The rules may identify one or more operations to be take or implemented based on the event information. For example, such rules may define one or more operations to be implemented if a particular user identifier is detected, or if a particular class of user is detected. Such rules may define one or more operations to be implemented if various other conditions are detected, such as a number of requests received within a designated time window, mismatches between the request and one or more aspects of an application environment, such as a role, or mismatches between geographical identifiers associated with the request, such as an IP address, and application environment data, such as a user's address.

In various embodiments, the rules further identify one or more conditions or parameters that cause the implementation of the operations disclosed herein. For example, the rules may identify criteria/patterns of activity that are tied to a combination of device/application information and identifiers. As will be discussed in greater detail below, the rules may be data structures configured to map conditions and parameters to security operations. In some embodiments, such rules may be determined by the server plugin based previous activity or activity in related application environments may be used to auto-populate the rules. The rules may also be generated by identifying and importing rules from another application environment. In various embodiments, the rules are generated based on one or more artificial intelligence or machine learning algorithms.

Method 500 may proceed to operation 508 during which the request may be modified. In various embodiments, the server plugin may determine that the request should be modified based, at least in part, on the retrieved rules. For example, it may be determined that portions of the request provided to other components, such as an application server, or portions of a reply provided to the client device should be masked. Accordingly, the server plugin may modify the data included in the request to mask specific portions of the request. For example, such masking may be implemented by replacing masked characters with a symbol. The request, as well as replies to requests, may also be modified to include customized user interface (UI) elements that may enable or disable features such as external downloads, exports to other applications, or masking of images. In some embodiments, the request may also be modified to include additional authentication measures, such as multifactor authentication.

Method 500 may proceed to operation 510 during which a notification may be generated. In various embodiments, the server plugin may be configured to generate a notification in response to identifying one or more conditions associated with the request. For example, if a user makes a particular number of requests within a period of time, or if a number of requests for access to a data record are made with in a period of time, a notification may be generated that provides a notification to an entity, such as a system administrator. Furthermore, the notification may include customized UI elements that provide hyperlinks to log files as well as various other information associated with the requests.

Method 500 may proceed to operation 512 during which one or more security or authentication operations may be implemented. In various embodiments, the server plugin may be configured to implement one or more security or authentication operations in response to identifying one or more conditions associated with the request. As noted in a previous example, if a user makes a particular number of requests within a period of time, or if a number of requests for access to a data record are made with in a period of time, the server plugin may implement additional authentication measures, such as multifactor authentication, for that user and/or that data record. In this way, the server plugin is configured to automatically implement security and authentication measures based on tracked and logged event information. As noted above, the combinations of conditions that trigger the security or authentication operations may be determined based on criteria/patterns of activity that are tied to a combination of device/application information and identifiers. In this way, the system may dynamically populate and continue to implement such operations specific to an application environment as activity in the application environment changes and evolves.

Figure 6:
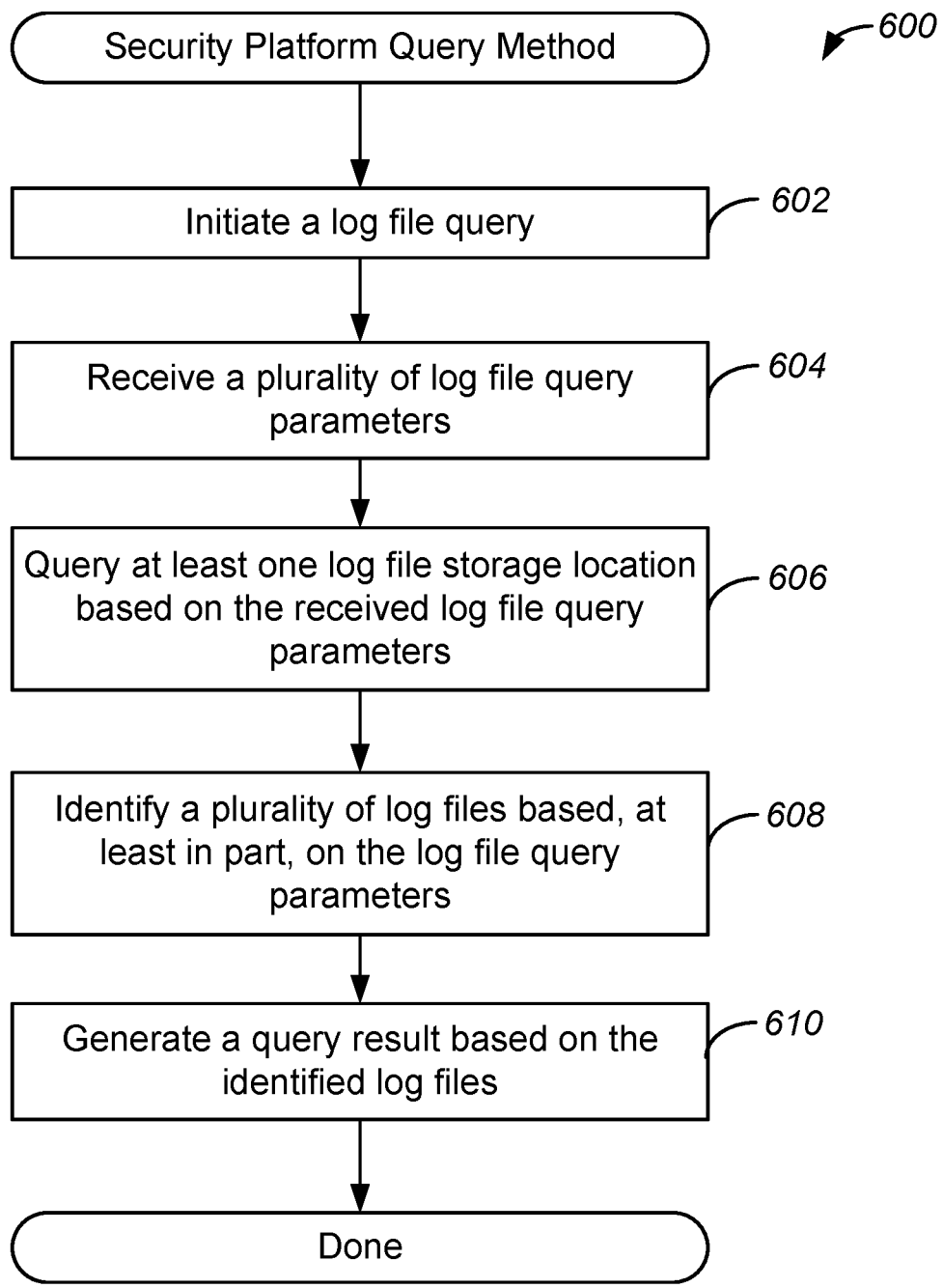
FIG. 6 illustrates an example of a flow chart of a method for implementing a query of security platform log files.

FIG. 6 illustrates an example of a flow chart of a method for implementing a query of security platform log files. Method 600 may commence with operation 602 during which a log file query may be initiated. In some embodiments, the log file query is initiated in response to receiving a request from a client device. Accordingly, a user of the client device may initiate a query by providing an input to the client device, and the client device may generate a request including log file query parameters. In various embodiments, a log file query may be initiated by one or more components of a web server, and may be implemented automatically. For example, a server plugin may identify one or more operational parameters or a status identifier, and may initiate the log file query in response to the identification of such operational parameters and/or status identifiers. In some embodiments, operational parameters may identify actions, operations, and requests made by system components, as well as identifiers associated with such components. In one example, such operational parameters are configured to identify a designated number of accesses to a storage location requested by a particular client device within a designated time window. If such abnormal activity is identified, the log file query may be initiated to pull contextual log file information associated with that client device and storage location. Moreover, status identifiers may refer to statuses of various components of the security platform. In this way, operational and status information may also be used to automatically initiate a log file query.

Method 600 may proceed to operation 604 during which a plurality of log file query parameters may be received. As noted above, the log file query parameters may be received in the request sent from a client device and/or may be retrieved by one or more system components, such as the server plugin. In various embodiments, log file query parameters may identify various features and characteristics of system components or entities, as well as activities associated with such system components or entities. For example, such parameters may identify one or more types of events, such as data or storage location accesses, client device requests, or data entry modifications. Such parameters may also identify various system entities, such as users, and characteristics of users, such as user identifiers, user roles, user access levels. The parameters may also be temporal parameters that designate a particular time window over which logged activity should be queried. As discussed above, the parameters may be specifically configured for a particular application flow, and may include a series of conditional parameters that enables the specific identification of logged events within such an application flow.

Method 600 may proceed to operation 606 during which at least one log file storage location may be queried. Accordingly, a system component, such as the server plugin, may execute the query on a storage location used to store the log files, such as a log file storage discussed above with reference to FIGS. 1 and 2. Accordingly, the log file query parameters may be used to query the log files, and as described above, the log files themselves are specifically configured and logged to facilitate such a query with significantly reduced processing time and overhead/resource usage. In various embodiments, multiple storage locations may be queried. Accordingly, log files may be logged and stored in a distributed file storage system, or in a clustered storage system, and the query may be implemented across multiple storage locations, and utilizing several query nodes.

In some embodiments, the query of the log file storage location may be implemented via a query interface that is generated for an entity, such as a user. In this example, the entity may have requested and initiated the query, and may be presented with a customized query interface to facilitate implementation of the query. In various embodiments, the query interface is generated based on combinations of criteria/patterns of activity that are tied to combinations of device/application data. For example, the components of the user interface may be identified and included in the user interface based on the parameters of the log file as may be determined by the log file itself, or an associated log token. Examples of such components may be data fields for text entry and drop-down menus. Such components may be used to receive query parameters, display query results, and apply filters to the query.

Method 600 may proceed to operation 608 during which a plurality of log files may be identified based, at least in part, on the plurality of log file query parameters. As noted above, the generation of the log files may be customized and implemented in a manner specific to an application environment, and in a manner that logs activity across multiple domains and layers of the application environment. Accordingly, log files with data entries matching those identified by the query parameters may be identified. In various embodiments, the query executed on the log files may be configured based on one or more parameters of the requesting device and/or user associated with the query. For example, if a user has requested the query and has a designated role or access level, a query node configured to implement the query may only access and identify log files having a corresponding access level or lower, as may be determined by the rules engine. Moreover, identified log files may be sorted and filtered. For example, log files may be sorted chronologically, or based on one or more log file query parameters, such as a user identifier, an event type, or a client device identifier. In another example, log files may be filtered based on one or more designated user parameters, where the parameter used for sorting or filtering is user specified.

Method 600 may proceed to operation 610 during which a query result may be generated. Accordingly, a system component, such as the server plugin, may be configured to generate a result object that includes the identified log files, and the result object may be provided to the requesting client device. In some embodiments, the server plugin may be configured to implement one or more data masking operations to mask data entries included in the log files. Furthermore, due to the targeted nature of the log file query, the user provided with the results of the query does not access the entire bulk of underlying logged activity, but is only provided with the targeted logged activity identified by the query parameters. In this way, the underlying logged activity is secure from the user unless access is appropriate as determined per query.

Figure 7:
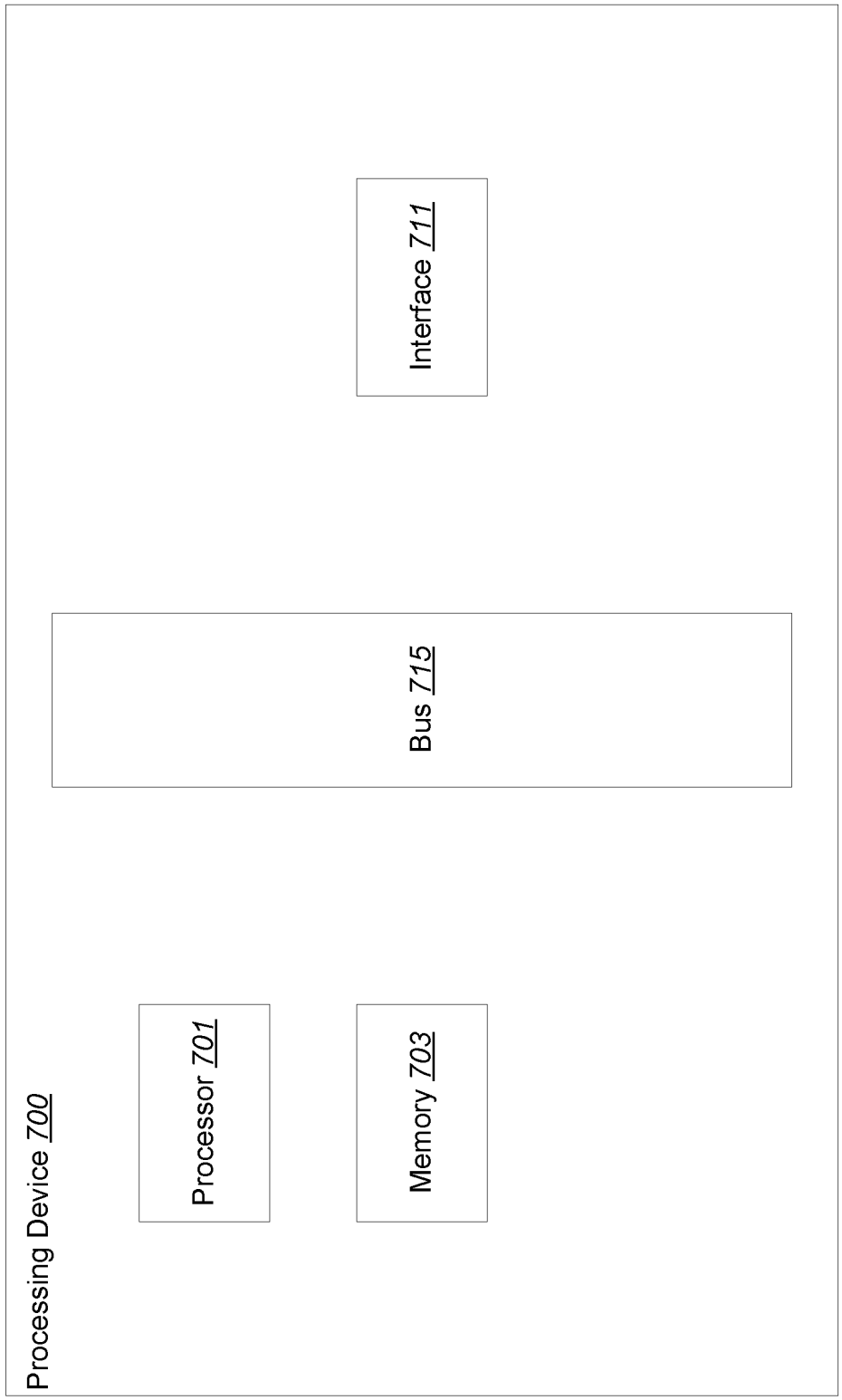
FIG. 7 illustrates an example of a processing device, configured in accordance with various embodiments.

FIG. 7 illustrates an example of a processing device, configured in accordance with various embodiments. For instance, the processing device 700 can be used to implement one or more components of servers according to various embodiments described above. In addition, the processing device 700 shown can represent a processing device on a mobile device or on a traditional computer or laptop, etc. According to particular example embodiments, a device 700 suitable for implementing particular embodiments of the present invention includes a processor 701, a memory 703, an interface 711, and a bus 715 (e.g., a PCI bus). The interface 711 may include separate input and output interfaces, or may be a unified interface supporting both operations. When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the device 700 uses memory 703 to store data and program instructions and maintain a local side cache. The program instructions may control the operation of an operating system and/or one or more applications, for example. The memory or memories may also be configured to store received metadata.

Because such information and program instructions may be employed to implement the systems/methods described herein, the present embodiments relate to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A system comprising:
a first server comprising one or more processors configured to:
receive one or more custom parameters;
receive a request associated with an application from a client device, wherein the request comprises event information;
retrieve a log token based on the request, wherein the log token comprises the one or more custom parameters and a custom structure;
generate at least one log file based on the log token, wherein generating the at least one log file based on the log token comprises:
filtering the event information based on the one or more custom parameters, wherein the one or more custom parameters are configured to determine a plurality of data fields and a plurality of types of data values from the event information to be included in the at least one log file;
determining a portion of the event information based on the one or more custom parameters; and
storing the portion of the event information as the at least one log file based on the custom structure, wherein the at least one log file comprises the portion of the event information organized based on the custom structure;
a second server comprising one or more processors configured to host an application accessed by the client device, wherein the first server is coupled between the client device and the second server and is configured to handle requests between the client device and the second server; and
a database system configured to store application data associated with the application and the client device.

2. The system of claim 1, wherein each log file of the at least one log files comprises at least one of: a user identifier, an application identifier, a device identifier, a browser identifier, and a time stamp.

3. The system of claim 1, wherein the first server further comprises:
a storage device configured to store the at least one log file.

4. The system of claim 1, wherein the one or more processors of the first server are further configured to modify the request received from the client device based on a plurality of rules identified based, at least in part, on the request.

5. The system of claim 4, wherein the modifying of the request comprises masking one or more data values included in the request.

6. The system of claim 1, wherein the one or more processors of the first server are further configured to implement multifactor authentication for the client device based on a plurality of rules identified based, at least in part, on the request received from the client device.

7. The system of claim 1, wherein the one or more processors of the first server are further configured to generate a notification based on a plurality of rules identified based, at least in part, on the request received from the client device.

8. The system of claim 1, wherein the one or more processors of the first server are further configured to execute a query on the at least one log file and generate a result object based on the query.

9. A device comprising:
a first communications interface communicatively coupled to a client device; a processing device comprising one or more processors configured to:
receive one or more custom parameters;
receive a request from an application from the client device, wherein the request comprises event information;
retrieve a log token based on the request, wherein the log token comprises of the one or more custom parameters and a custom structure;
generate at least one log file based on the log token, wherein generating the at least one log file based on the log token comprises:
filtering the event information based on the one or more custom parameters, wherein the one or more custom parameters are configured to determine a plurality of data fields and a plurality of types of data values from the event information to be included in the at least one log file;
determining a portion of the event information based on the one or more custom parameters; and
storing the portion of the event information as the at least one log file based on the custom structure, wherein the at least one log file comprises the portion of the event information organized based on the custom structure;
a storage device configured to store the plurality of log files; and
a second communications interface communicatively coupled to a second server, the second server being configured to host the application accessed by the client device.

10. The device of claim 9, wherein the processing device is further configured to modify the request received from the client device based on a plurality of rules identified based, at least in part, on the request.

11. The device of claim 9, wherein the processing device is further configured to implement multifactor authentication for the client device based on a plurality of rules identified based, at least in part, on the request received from the client device.

12. The device of claim 9, wherein the processing device is further configured to generate a notification based on a plurality of rules identified based, at least in part, on the request received from the client device.

13. A method comprising:
receive one or more custom parameters;
receiving, at a first communications interface of a first server, a request associated with an application from a client device, wherein the request comprises a event information;
retrieve a log token based on the request, wherein the log token comprises of the custom parameters and a custom structure;
generating, using a processing device of the first server, at least one log file based on the log token, wherein generating the at least one log file based on the log token comprises:
filtering the event information based on the one or more custom parameters, wherein the one or more custom parameters are configured to determine a plurality of data fields and a plurality of types of data values from the event information to be included in the at least one log file;

determining a portion of the event information based on the one or more custom parameters; and storing the portion of the event information as the at least one log file in a storage device of the first server based on the custom structure, wherein the at least one log file comprises the portion of the plurality of event information organized based on the custom structure.

14. The method of claim 13, wherein the one or more custom parameters identify a plurality of data fields and a plurality of types of data values from the event information to be included in the at least one log file.

15. The method of claim 13 further comprising:
identifying a plurality of rules based, at least in part, on the request; and
modifying the request received from the client device based on the plurality of rules.

16. The method of claim 15, wherein the modifying of the request further comprises:
masking one or more data values included in the request.

17. The method of claim 13 further comprising:
identifying a plurality of rules based, at least in part, on the request; and
implementing multifactor authentication for the client device based on the plurality of rules.

18. The method of claim 13 further comprising:
identifying a plurality of rules based, at least in part, on the request; and
generating a notification based on the plurality of rules.

* * * * *